Nov. 22, 1966 U. DOMM ETAL 3,286,925
QUICK ACTING THERMOSTATIC STEAM TRAP
Original Filed Aug. 26, 1963

INVENTORS:
ULRICH DOMM
WERNER FÖLLER
RUDOLF EGELHOFER

ATTORNEY

3,286,925
QUICK ACTING THERMOSTATIC STEAM TRAP

Ulrich Domm and Werner Föller, Frankenthal, Pfalz, and Rudolf Egelhofer, Borrstadt, Pfalz, Germany, assignors to Klein, Schanzlin and Becker Aktiengesellschaft, Frankenthal, Pfalz, Germany
Original application Aug. 26, 1963, Ser. No. 305,029. Divided and this application Oct. 24, 1965, Ser. No. 504,848
Claims priority, application Germany, Sept. 19, 1961, K 44,748
8 Claims. (Cl. 236—59)

The present application is a divisional application of the copending application filed August 26, 1964 with the Serial Number 305,029 which in turn is a continuation-in-part application of the application filed May 21, 1962 with Serial Number 196,209, both applications now abandoned.

The present invention relates to thermostatically actuated valves in general, and more particularly to an improved thermostatically actuated valve which is especially suited for regulating the outflow of condensate and for preventing escape of steam from steam traps.

In many conventional steam traps of which we are aware at this time, the valve is assembled and arranged in such a way that, at a temperature which corresponds to the temperature of saturaed steam, the thermoelastic force of the bimetallic element is sufficient (a) to overcome the static fluid pressure which acts against the sealing element of the valve and which tends to open a path for the escape of fluid, and (b) to produce the necessary sealing force which resists the pressure of steam. A serious drawback of such steam traps is that the bimetallic element must be adjusted in a manner to necessitate cooling well below steam temperature before it can open a path for escape of the condensate. This is due to the fact that the hydrodynamic pressure of the fluid acting against the sealing element of the valve when the fluid is free to escape from the steam trap is much greater than the static pressure of the fluid which acts against the sealing element at the time the sealing element engages the valve seat and prevents escape of fluid from the steam trap. In other words, at the time when it should move the sealing element to a sealing position, the bimetallic element must overcome a substantial force which is produced by hydrodynamic pressure of fluid acting against the sealing element so that, in order to again open the steam trap, it is necessary to cool the bimetallic element well below that temperature which would suffice were the static pressure of fluid against the sealing element in the latter's sealing position as great as the dynamic pressure to which the sealing element is subjected in its open position.

Accordingly, it is an important object of the present invention to provide a thermostatically actuated valve for use in steam traps which is constructed and assembled in such a way that its sealing element can be shifted very rapidly into sealing or open position, and wherein the bimetallic element need not be cooled well below steam temperature before it can move the sealing element to open position.

Another object of the invention is to provide a very simple, rugged and reliable thermostatically actuated valve of the just outlined characteristics which can be readily installed in many types of steam traps, which can utilize many types of known bimetallic elements, which occupies little space, which is of lightweight construction, and whose sealing and opening action is fully automatic.

With the above objects in view, the invention resides in the provision of a steam trap embodying a thermostatically actuated valve and arranged in such a way that it compensates for, or at least partially counteracts, the opening force produced by hydrodynamic pressure of the fluid against the sealing element as soon as the temperature of the fluid medium reaches a predetermined value. As a result of such construction of the valve, the thermoelastic force of the bimetallic element overcomes the opening force which acts against the sealing element and enables the sealing element to rapidly close the valve as soon as the ouflowing fluid reaches a predetermined temperature.

More specifically, the invention provides an improved steam trap wherein the sealing element of the valve defines with a portion of the steam trap a restricted passage for the outflow of fluid so that, at a given temperature, the fluid can flash into vapor only at the downstream side of the sealing element to produce a force which tends to counteract the hydrodynamic pressure and which enables the bimetallic element to rapidly seal the inlet passage of the steam trap from the outlet passage.

The essential feature of the present invention, that is to provide between the sealing element of the valve and a portion of the outlet passage means a restricted passage for the outflow of the fluid by means of which the above advantageous results are obtained, has however the disadvantage to limit discharge of fluid from the steam trap, regardless of the temperature of the fluid.

According to a further development of the present invention it is also an object of the invention to provide a steam trap which accomplishes the above discussed results and which is so constructed as to permit discharge of an increased amount of fluid when the temperature of the fluid passing through the steam trap decreases.

With this additional object in view, the steam trap according to the present invention is further constructed in such a way that the cross section of the restricted passage for the outflow of the fluid increases as the temperature of the fluid passing through the restricted passage decreases below a given temperature. By this arrangement the formation of the force which tends to counteract the hydrodynamic pressure exerted on the sealing element of the valve remains assured for a predetermined temperature, while at a temperature lower than said perdetermined temperature a greater amount of fluid may pass through the opened valve of the outlet passage means of the steam trap.

The increase of the cross section of the restricted passage may be accomplished by providing a plate-shaped bimetallic element fastened to the downstream side of a sealing element cooperating with a valve seat in the outlet passage means of the steam trap for opening or closing the latter or by arranging an annular bimetallic element spaced from and about the sealing element.

It is also possible to change the cross section of the restricted passage in dependence of the stroke of the sealing element so that the cross section of the restricted passage increases during drop of the temperature of the fluid passing through the steam trap. For this purpose, the sealing element may be provided at the side thereof downstream from the valve seat with a frusto-conical enlargement and the outlet passage may be formed in the region of this enlargement with a corresponding frusto-conical inner surface so that the cross section of the passage defined between the outer surface of the enlargement and the inner surface of the outlet passage increases when the temperature of the medium passing through the open valve decreases.

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawings, in which:

Figure 1:
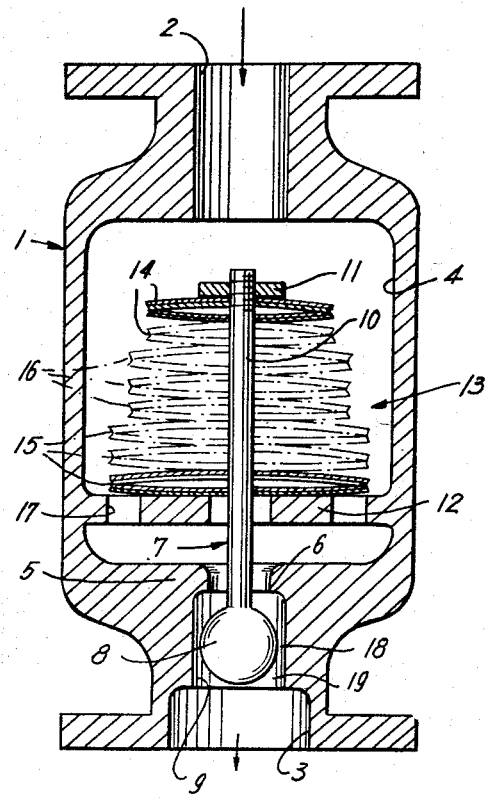
FIG. 1 is an axial section through a steam trap comprising a thermostatically actuated valve which embodies our invention.

It is understood that the arrangements shown in FIGS. 3–8 show only part of the steam trap according to the present invention and that the other parts of the steam trap are constructed as shown in FIG. 1.

Referring now in greater detail to an illustrated embodiment, and first to FIG. 1, there is shown a steam trap comprising a housing 1 which is provided with an inlet passage 2 and with a spaced outlet passage 3. The inlet passage 2 leads into an enlarged fluid chamber 4 which is partially separated from the outlet passage 3 by a partition 5 defining a valve seat 6 of circular outline. The seat 6 may be sealed by a sealing element or valve member in the form of a spherical head 8 which constitutes the lower end portion of a valve stem 7.

As shown, the head 8 is located in a cylindrical compartment 9 defined by the housing 1 and constituting a smaller-diameter extension of the outlet passage 3. The valve stem 7 extends loosely through the valve seat 6 and into the chamber 4, and its externally threaded upper end portion 10 meshes with an adjusting and retaining nut 11. Intermediate the nut 11 and the upper side of an intermediate wall 12 of the housing 1, the valve stem slidably supports a bimetallic element 13 located in the path of fluid flowing through the chamber 4 and comprising a series of dished bimetallic discs which, in the illustrated embodiment, include four smaller-diameter discs 14, six larger-diameter discs 15, and six intermediate discs 16. The wall 12 constitutes a fixed abutment means for the discs 15 and is formed with a series of ducts 17 through which the fluid entering the chamber 4 via the inlet passage 2 may flow toward the valve seat 6.

Figure 2:
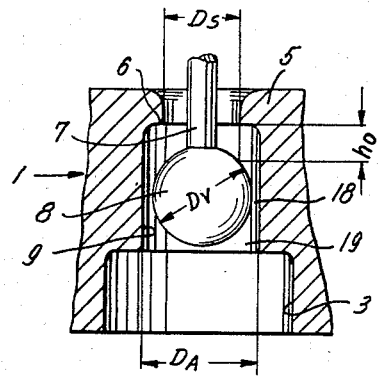
FIG. 2 is an enlarged detail view of a portion of the steam trap shown in FIG. 1.

In accordance with our invention, the diameter $D_A$ of the cylindrical compartment 9 (see FIG. 2) is slightly greater than the diameter $D_V$ of the valve head 8 so that the valve head and the cylindrical wall of the compartment 9 define between themselves a restricted annular gap 18 through which the fluid must pass on its way to the outlet passage 3. The portion 19 of the compartment 9 at the underside of the head 8, i.e., at the downstream side of the gap 18, constitutes an expansion zone for the fluid. The diameter of the seat 6 is indicated by the reference character $D_s$. The reference character $h_o$ indicates the length of the stroke performed by the stem 7 and head 8 in response to a change in fluid temperature from about 20° C. to 100° C.

It has been found that the valve of FIG. 1 will immediately seal the chamber 4 from the outlet passage 3 if $$(D_A^2 - D_V^2)/(D_s \cdot h_o) = 1-1.4$$

and $$D_s/D_V = 0.75-0.85$$

Of course, the situation is analogous if the valve stem 7 is provided with a non-spherical valve head and if the walls of the compartment 9 are not cylindrical, as long as the gap 18 is sufficiently restricted to cause flashing of condensate into vapor at the time the condensate enters the expansion zone 19.

The operation of the steam trap is as follows:

When the temperature of condensate flowing into the chamber 4 equals or approaches room temperature, the discs 14–16 of the element 13 are flattened out so that the valve head 8 is spaced from the seat 6 and allows the condensate to flow through the gap 18, through the expansion zone 19 and into the outlet passage 3. When the system in which the housing 1 of the steam trap is installed comes up to heat, the condensate is heated and would flash into vapor right in the chamber 4 were it not for the restricted gap 18 which causes the heated condensate to increase its pressure in the chamber 4 and to evaporate as soon as it enters the expansion zone 19.

It has been found that, especially if the valve seat, the head of the valve stem, the stroke of the valve stem and the diameter of the compartment 9 are selected in a manner as described above, the element 13 is capable of instantaneously sealing the valve seat as soon as the temperature of fluid in the chamber 1 reaches a predetermined value.

FIGS. 3–8 illustrate further embodiments according to the present invention in which the sealing element and/or the outlet passage means are constructed in such a manner so as to increase the restricted passage defined between the outer surface of the sealing element and the inner surface of the outlet means as the temperature of the fluid passing through the outlet passage means of the steam trap decreases.

It is to be understood that FIGS. 3–8 show only part of steam traps according to the present invention while the unillustrated parts of the steam traps are constructed in the manner shown in FIG. 1.

Figure 3:
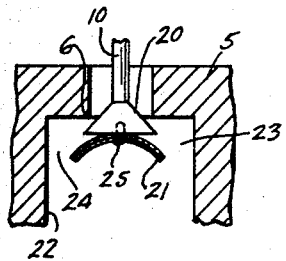
FIG. 3 is an axial section through part of a steam trap according to the present invention constructed to provide an increase of the cross section of the restricted passage as the temperature of the medium passing through this passage decreases and FIG. 3 shows the arrangement during passage of relatively cool fluid therethrough.
Figure 4:
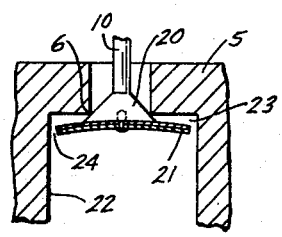
FIG. 4 is an axial cross section similar to FIG. 3 and showing the arrangement during passage of relatively hot fluid therethrough.

FIGS. 3 and 4 illustrate part of an embodiment in which the sealing element of the steam trap and the outlet passage means are constructed so that the restricted passage increases when the temperature drops below a predetermined temperature. FIG. 3 shows the arrangement during passage of a fluid of relatively low temperature therethrough, whereas FIG. 4 shows the arrangement when fluid of relatively high temperature passes therethrough.

The arrangement shown in FIGS. 3 and 4 comprises a substantially frusto-conical sealing element 20 integral with or connected in any suitable manner to the lower end of the valve stem 10 only partially shown in these figures and cooperating with a valve seat 6 formed in the lower part 5 of the housing of the steam trap for permitting outflow of fluid from the steam trap when the sealing element 20 is moved away from the valve seat 6. A bimetallic plate 21 coaxially arranged with the valve stem 10 is fixed at a central portion thereof, for instance by a rivet 25, to the bottom face of the frusto-conical sealing element 20 and the bimetallic plate 21 has an outer diameter larger than the maximum diameter of the frusto-conical sealing element 20 so as to define, when relative hot fluid flows through the outlet passage 23 between the inner surface 22 of the latter and the edge surface of the bimetallic plate 21, which during passage of hot fluid through the outlet passage 23 is in substantially flattened state as shown in FIG. 4, a restricted passage 24 so that the fluid passing through this restricted passage will flash only downstream of the passage into vapor to provide thereby against the bottom face of the plate-shaped bimetallic element 21 a counter force at least partly counteracting the hydrodynamic pressure of liquid condensate against the upper surface of the sealing element 20 in the manner as described before in connection with the embodiment illustrated in FIG. 1.

The bimetallic plate 21 is constructed in such a manner to curve to the shape as illustrated in FIG. 3 when the temperature of the medium passing through the outlet passage 23 decreases so as to increase thereby the cross section of the passage 8 and since during decrease of the temperature of the fluid, the sealing element 20 will move further away from the valve seat 6 a greater amount of relative cool fluid may be discharged from the steam trap.

Figure 5:
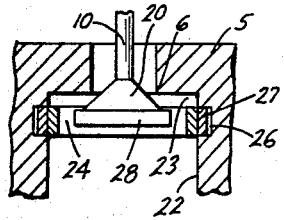
FIG. 5 is an axial cross section through part of another embodiment of the valve arrangement of the steam trap according to the present invention and showing this arrangement during passage of relatively cool fluid therethrough.
Figure 6:
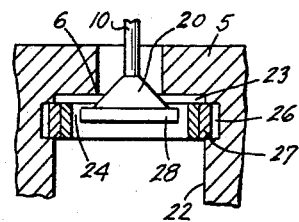
FIG. 6 is an axial cross section similar to FIG. 5 and showing the arrangement of FIG. 5 during passage of relatively hot fluid therethrough.

In the arrangement as shown in FIGS. 5 and 6 an annular groove 26 is formed in the outlet passage 23 downstream of the valve seat 6 and extending outwardly from the inner surface 22 of the outlet passage 23. An annular bimetallic element 27, which may be in the form of a closed ring or in the form of a split ring in which the ends of the ring are slightly overlapped, is located in groove 26 and surrounds a substantially cylindrical shoulder 28 formed at the bottom of the sealing element 20 spaced from the outer surface of the shoulder to define therewith a restricted passage 24. The annular bimetallic element 27 is constructed to contract when the temperature of the fluid passing through the restricted passage increases so as to decrease the cross section of the passage 24 as shown in FIG. 6, whereas during decrease of the temperature of the fluid the annular bimetallic element 27 expands so as to increase the cross section of the passage 24 as shown in FIG. 5.

It is to be understood that the sealing element 20 shown in FIGS. 3–6 is moved toward and away from the valve seat under the action of the bimetallic element 13 connected to the valve stem as described above in connection with FIG. 1.

Figure 7:
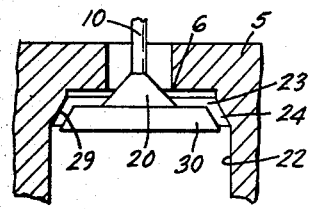
FIG. 7 is an axial cross section through part of a further valve arrangement according to the present invention and showing this arrangement during passage of relatively cool fluid therethrough.
Figure 8:
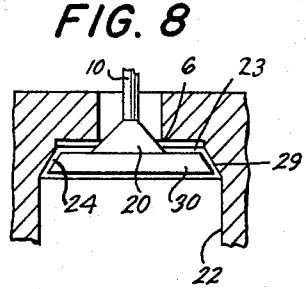
FIG. 8 is an axial cross section showing the arrangement of FIG. 7 during passage of relatively hot fluid therethrough.

The frusto-conical sealing element 20 shown in FIGS. 7 and 8 is formed at the downstream end thereof with an enlargement 30 having an outer frusto-conical surface substantially coaxial with the valve stem 10, whereas the outlet passage 23 is formed in the region of the frusto-conical surface of the enlargement 30 with a corresponding frusto-conical inner surface surrounding the first mentioned frusto-conical surface and defining therewith a restricted passage 24 decreasing in cross section when the sealing element 20 moves toward the valve seat 6 and increasing in cross section when the sealing element 20 moves away from the valve seat 6. As described before in connection with the embodiment shown in FIG. 1, the sealing element 20 will move toward the valve seat 6 through the action of the bimetallic element 13 located in the chamber 4 of the housing 1 of the valve trap when the temperature of the fluid entering the valve trap increases, so that during such temperature increase the cross section of the flow passage between the sealing element 20 and the valve seat 6 decreases simultaneously with decrease of the cross section of the restricted passage 24 formed between the outer surface of the enlargement 30 and the inner surface portions of the outlet passage 23 facing the outer surface of the enlargement 30 so that during a temperature increase a restricted passage of small cross section will be formed which permits flashing of the fluid passing therethrough into vapor only downstream of this restricted passage, while during decrease of the temperature of the fluid flowing through the outlet passage the cross section of the restricted passage 24 will increase when the sealing element 20 moves away from the valve seat 6 to provide in this way, as shown in FIG. 7 an increased flow passage through which an increased amount of fluid may flow out of the steam trap.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A steam trap comprising, in combination, a housing defining a condensate collecting chamber having an inlet passage, an outlet passage spaced from said inlet passage, and partition means between said chamber and said outlet passage and defining a valve seat facing away from said chamber and having a cross section smaller than that of said outlet passage; and valve means comprising a sealing element in said outlet passage movable toward and away from said valve seat between a closed and an open position, said sealing element having a first portion adapted to engage said valve seat in said closed position of said sealing element and defining with the valve seat when said sealing element is out of engagement therewith a first restricted passage increasing in cross section during movement of said sealing element away from said valve seat and decreasing in cross section during movement of said sealing element toward said valve seat, said sealing element having in said outlet passage a second portion of enlarged cross section having a surface spaced from and facing said valve seat, and said enlarged cross section of said second portion being only slightly smaller than that of said outlet passage and defining in said outlet passage about said second portion a second restricted passage, said outlet passage and said second portion of said sealing element being constructed and arranged so that during movement of said sealing element away from said valve seat the cross-sectional area of said second restricted passage increases and during movement of said sealing element toward said valve seat said cross-sectional area of said second restricted passage decreases, and bimetallic means located in said chamber in the path of fluid flowing to said valve seat and operatively connected to said sealing element for moving the latter to said closed position in response to a predetermined temperature of said fluid and against the pressure the fluid exerts against said sealing element in a sense to maintain the latter in the open position, while permitting said sealing elements to move to said open position under the pressure of the fluid when the temperature of the latter drops below said predetermined temperature, whereby during movement of said sealing element to said open position fluid pressure on said surface will cause fast movement of said sealing element to said open position until after discharge of condensate collecting chamber the temperature of the fluid about said bimetallic means will rise causing the latter to move said sealing element toward said closed position, whereupon the cross section of said first restricted passage will become smaller than that of said second restricted passage causing thereby sudden decrease in pressure in the space between said valve seat and said surface of said second portion of said sealing element and fast movement of the sealing element to said closed position.

2. A steam trap as set forth in claim 1, wherein said bimetallic means is constructed to move said sealing element to said closed position at a temperature of about 100° C.

3. A steam trap as set forth in claim 1, wherein said second restricted passage has a cross section causing, when sealing element moves to said open position, the fluid passing through said second restricted passage to flash into steam downstream of said second restricted passage.

4. A steam trap as set forth in claim 1, wherein said surface of said portion of said sealing element is a substantially plane surface extending substantially normal to the direction of movement of said sealing element.

5. A steam trap as set forth in claim 4, wherein said first and second portions of said sealing element have frusto-conical peripheral surfaces.

6. A steam trap as set forth in claim 5, wherein said outlet passage has about said frusto-conical peripheral surface of said second portion of said sealing element an inner frusto-conical surface of a cone angle substantially equal to that of said peripheral surface of said second portion of said sealing element resulting in a fast increase of the cross sectional area of said second restricted passage during movement of said sealing element to said open position.

7. A steam trap as set forth in claim 6, wherein said bimetallic means is constituted by a plurality of superimposed pairs of bimetallic discs located in said condensate collecting chamber, the discs of each pair of bimetallic discs curving in opposite directions during rise of the temperature in said chamber.

8. A steam trap as set forth in claim 7, wherein said sealing element is connected to said bimetallic discs by a rod extending through central openings in said discs and with ample clearance through said valve seat.

References Cited by the Examiner

UNITED STATES PATENTS

| 2,051,732 | 8/1936 | McKee. | |
|---|---|---|---|
| 2,387,792 | 10/1945 | Holmes | 236—48 |
| 2,749,045 | 6/1956 | Pape | 236—59 |
| 2,825,509 | 3/1958 | Pape et al | 236—59 |
| 3,042,363 | 7/1962 | Deeks | 236—59 X |

FOREIGN PATENTS

| 848,969 | 9/1960 | Great Britain. |
|---|---|---|
| 64,018 | 5/1925 | Sweden. |

ALDEN D. STEWART, *Primary Examiner.*